United States Patent [19]

Aspell et al.

[11] Patent Number: 5,223,705
[45] Date of Patent: Jun. 29, 1993

[54] MEASUREMENT OF AN OPTICAL AMPLIFIER PARAMETER WITH POLARIZATION

[75] Inventors: Jennifer Aspell, Tinton Falls; Neal S. Bergano, Lincroft; Bruce M. Nyman, Manalapan; Richard G. Smart, Holmdel; James W. Sulhoff, Ocean; John L. Zyskind, Shrewsbury, all of N.J.

[73] Assignee: AT&T Bell Laboratories, Murray Hill, N.J.

[21] Appl. No.: 929,660

[22] Filed: Aug. 12, 1992

[51] Int. Cl.[5] .............................. G02F 1/01; H01S 3/30
[52] U.S. Cl. .................................... 250/225; 372/6; 372/27; 250/227.17
[58] Field of Search ............... 359/341, 179, 177, 174, 359/110, 333; 372/6, 27; 250/225, 227.17, 227.21, 227.23; 356/364, 367

[56] References Cited

U.S. PATENT DOCUMENTS

| | | | |
|---|---|---|---|
| 4,949,348 | 8/1990 | Luijtjes | 372/27 |
| 4,963,832 | 10/1990 | Desurvire et al. | 359/341 |
| 5,005,175 | 4/1991 | Desurvire et al. | 359/341 |
| 5,088,095 | 2/1992 | Zirngibl | 372/6 |
| 5,107,512 | 4/1992 | Shibutani | 372/27 |
| 5,115,338 | 5/1992 | DiGiovanni et al. | 359/341 |
| 5,117,303 | 5/1992 | Desurvire et al. | 359/341 |
| 5,128,800 | 7/1992 | Zirngibl | 372/6 |
| 5,138,621 | 8/1992 | Goto et al. | 372/6 |
| 5,162,936 | 11/1992 | Taga et al. | 359/177 |

FOREIGN PATENT DOCUMENTS

| | | | |
|---|---|---|---|
| 0281774 | 11/1990 | Japan | 372/6 |
| 0005731 | 1/1991 | Japan | 359/341 |
| 0127886 | 5/1991 | Japan | 372/6 |
| 0127887 | 5/1991 | Japan | 372/6 |
| 2244595 | 12/1991 | United Kingdom | 372/6 |

*Primary Examiner*—David C. Nelms
*Assistant Examiner*—Michael Messinger
*Attorney, Agent, or Firm*—E. Weiss

[57] ABSTRACT

In an embodiment for obtaining accurate noise figure measurements for any degree of saturation of an optical amplifier, a polarizer is located at the output of the optical amplifier. The amplified spontaneous noise (ASE) produced by an optical amplifier is not polarized, whereas the amplified signal has a well defined state of polarization which is preferably linear. If the amplified signal is not linearly polarized, it can be rendered linearly polarized in one direction by means of a polarization controller located downstream of the polarizer. By setting the polarizer to have its state of polarization orthogonal to that of the linearly polarized amplified signal, the spectral density of the ASE from the polarizer can be measured without associated distortion due to the signal. By sequentially adjusting the polarization controller to minimize and then maximize the signal which it passes, sequential measurements of the ASE spectral density and gain of the optical amplifier can be obtained. Continuous measurements of the ASE can be obtained by placing a splitter such as a 3dB coupler between the polarizer and the optical amplifier and setting the state of polarization of the polarizer to be continuously orthogonal to the state of polarization of the amplified signal from one leg of the splitter. At the same time, a signal from the other leg of the splitter which consists of ASE noise plus the amplified signal can be used to obtain the gain of the optical amplifier. From the measurements of the ASE with and without the amplified signal, the noise figure of the optical amplifier can be calculated.

18 Claims, 2 Drawing Sheets

MEASUREMENT OF AN OPTICAL AMPLIFIER PARAMETER WITH POLARIZATION

FIELD OF THE INVENTION

This invention relates generally to the testing of optical amplifiers. More particularly, this invention relates to the measuring of the noise characteristics of optical amplifiers under various operating conditions.

BACKGROUND OF THE INVENTION

The primary parameters for characterizing the performance of an optical amplifier are the gain, the output power and the noise figure. The gain and output power of an amplifier are relatively easy to measure. However, the accurate determination of the noise figure is more difficult, particularly in the case of saturated operation, which is of great practical importance. The problem arises when the amplified spontaneous emission (ASE) spectral density is measured at the signal wavelength in the presence of a large input signal. A common technique for measuring the noise figure of, for example, an erbium doped fiber amplifier involves fitting a curve to the ASE level near the signal and then extrapolating the curve to find the ASE noise level at the signal wavelength. The major problem with this technique is that the ASE spectrum is distorted by the sidebands of the signal source and by the optical spectrum analyzer response in the presence of a strong signal.

It is an object of this invention to provide a method and apparatus for more accurately measuring the noise figure of an optical amplifier under various operating conditions.

SUMMARY OF THE INVENTION

This object is achieved by using the polarization properties of the signal and the noise to controllably isolate the signal from the noise. In an optical fiber amplifier, the amplified spontaneous emission noise generated is not polarized; and, the input signal is polarized in one direction. By locating a polarizer at the output of the optical amplifier, and setting the polarizer to a state of polarization which is orthogonal to that of the amplified signal, the amplified spontaneous emission noise can be obtained and measured without the associated distortion due to the amplified signal. Using the value obtained for the amplified spontaneous emission and the gain of the optical amplifier, the noise figure (NF) can be calculated. In one embodiment, a polarization controller followed by a polarizer is placed between the optical amplifier and an optical spectrum analyzer. By either alternating the polarizer to pass and block the amplified signal or by alternately including and excluding the polarizer from the optical path, sequential measurements can be obtained of the amplified spontaneous emission without the amplified signal being present, and of the amplified spontaneous emission with the amplified signal; the latter being used to obtain the gain of the optical amplifier. In another embodiment, by using a splitter such as a 3dB coupler to split the signal from the optical amplifier into two parts and directing one part of the split signal to a polarizer set to be orthogonal to the polarization of the amplifier signal, and the other part of the split signal directly to a detector, simultaneous measurements can be made of the amplified spontaneous emission without the amplified signal being present and of the amplified spontaneous emission with the amplified signal being present, the latter being used to obtain the gain of the optical amplifier.

DETAILED DESCRIPTION

Erbium-doped fiber amplifiers are extremely attractive components for modern lightwave systems. Their attractive features include high efficiency, high output powers, polarization insensitivity and the ability to operate with noise figures near the 3dB quantum limit. Most current studies on the noise characteristics of erbium doped fiber amplifiers have focused on their behavior in the small-signal regime applicable to pre-amplifiers, where low noise is of paramount importance. However, another major application of erbium doped fiber amplifiers is as in-line amplifiers for long-haul transmission where both low noise and high output powers are required. Such amplifiers will be operated under a moderate degree of saturation. A final application of erbium-doped fiber amplifiers is as power amplifiers, where the output power is of primary importance, although low noise is also a desirable characteristic.

As noted above, the noise figure is a difficult parameter to determine, particularly when the amplified spontaneous emission (ASE) noise level is measured in the presence of a large input signal. There is here disclosed a method and apparatus for overcoming this problem by means of polarization nulling.

This invention is based on the fact that the amplified spontaneous emission noise produced by the optical amplifier is randomly polarized, whereas the amplified signal is polarized in one direction. Thus, by locating a polarizer at the output of the optical amplifier and setting the state of polarization of the polarizer to be orthogonal to that of the amplified signal, the ASE without the distortion due to the amplified signal can be obtained and measured. The NF can be accurately determined using this measured value and the gain of the optical amplifier.

Figure 1:
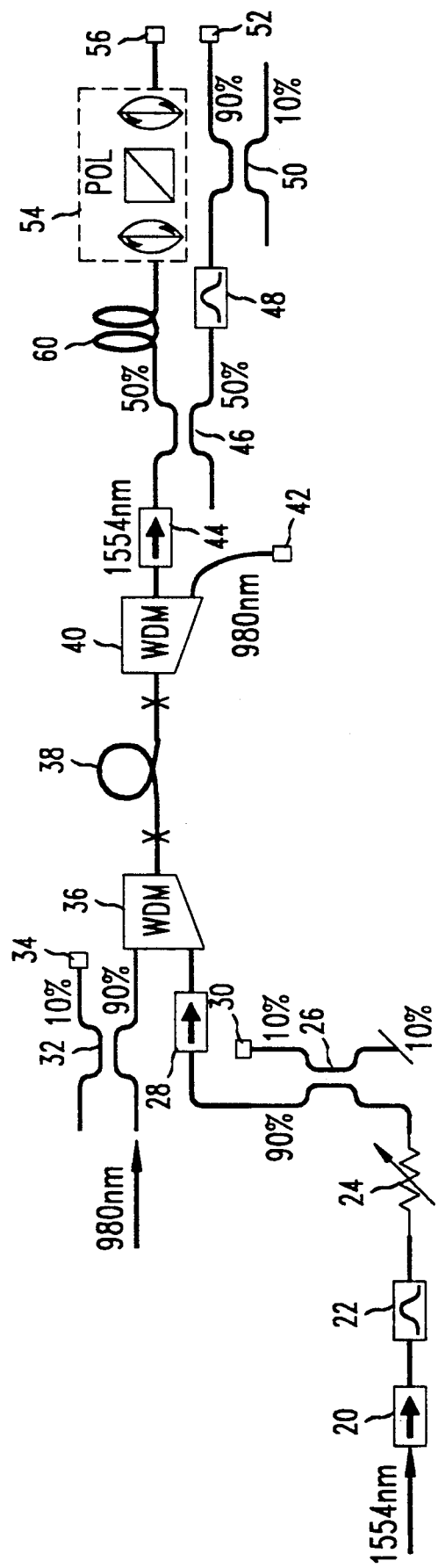
FIG. 1 illustrates an example of an arrangement for measuring the gain and/or noise figure of an optical fiber amplifier using the invention.

Referring to FIG. 1, there is illustrated an arrangement for obtaining the noise figure of an optical fiber amplifier using polarization-nulling. A signal source which lies within the gain bandwidth of the optical amplifier such as, for example, 1.554 μm generated by a laser diode is passed through an optical isolator 20, a 1 nm bandwidth bandpass filter 22, an attenuator 24, a 90%:10% fused fiber coupler 26 and a second isolator 28. The input signal is monitored at the 10% port of the fused fiber coupler 26 by a power detector 30 connected to a Hewlett-Packard (HP)8153A lightwave multimeter to determine its value. A source of pump power such as, for example, a 980 nm signal generated by a Ti:sapphire laser is connected to the 90% port of a 90%:10% fused fiber coupler 32, and is measured at the 10% port by a power detector 34 connected to an HP8153A lightwave multimeter. The pump signal from the coupler 32 and the input signal from the second isolator 28 are combined using a JDS Fitel Wavelength Division Multiplexer (WDM) 36. The combined signal from the WDM 36 is connected to an erbium-doped optical fiber amplifier 38. At the output of the erbium-doped optical amplifier, the transmitted pump power is separated from the signal by a JDS Fitel WDM 40. The pump power is measured by a power detector 42 connected to an HP8153A multimeter.

The amplified spontaneous emission and the amplified input signal from the erbium doped fiber amplifier 38 passes through the wavelength division multiplexer 40 and through an optical isolator 44. The filtered amplifier output signal from isolator 44 is split into two separate signals by a 50%:50% fused fiber coupler 46 to permit accurate determination of both the amplified signal power and the amplified spontaneous emission power under various operating conditions from small signal through saturated conditions. One signal from the 3dB coupler 46 is passed through a 1 nm bandwidth bandpass filter 48, and is thereafter split by a 90%:10% coupler 50. The bandpass filter 48 is used to select the signal wavelength and reject most of the ASE power. The amplified signal is measured at the 90% leg by a power detector 52 connected to an HP8153A meter. The output signal at the 10% leg can be used to examine the spectrum passed by the bandpass filter 48.

The other signal from the 3dB coupler 46 is passed through a polarization controller 60 which is adjusted to insure linear polarization of the amplified signal and then through a polarizer 54 which is set to be orthogonal to the state of polarization of the amplified signal. In those instances where the amplified signal is polarized in one direction, for example linearly, the polarization controller may not be necessary. The polarizer 54 suppresses the amplified signal by about 40dB and the ASE by about 3dB. This minimizes distortion of the measured amplified spontaneous emission spectrum which arises from the source side bands and amplified spontaneous emissions as well as from an optical spectrum analyzer which may be connected to analyze the signal when the signal is strong. The light passed by the polarizer 54 is detected by an Advantest Q8381 optical spectrum analyzer 56. The ASE level at the signal wavelength can be determined by fitting polynomial to the spectrum recorded by the optical spectrum analyzer 56. The measuring of the gain and noise figure of the saturated erbium-doped fiber amplifier can be automated by controlling the attenuator, lightwave detectors and spectrum analyzer with a computer over their GPIB interfaces using an appropriate program.

The gain, G, of the amplifier can be determined from the powers measured by power heads 30, 52. The noise figure (NF) of the amplifier is determined by the expression $$NF(\text{dB}) = 10\log_{10}\frac{P_{ASE}}{h\nu GB}$$

where $P_{ASE}$ is the measured ASE noise level in a given bandwidth B, h is Planck's constant, v is the optical frequency, and G is the gain of the amplifier.

Figure 2:
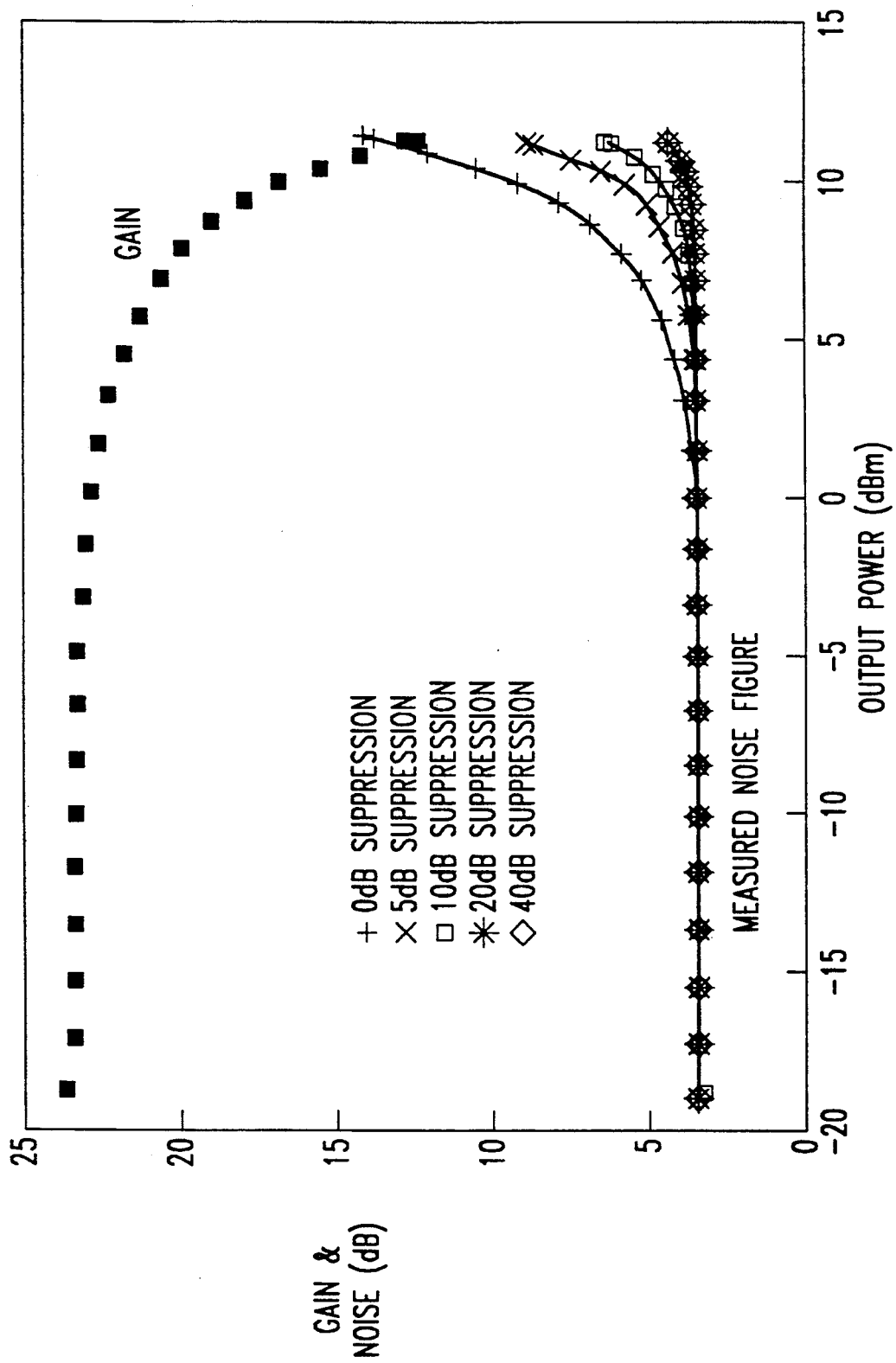
FIG. 2 illustrates curves of measured gain and noise figures as a function of output power for varying amounts of suppression signal.

Using the invention here disclosed, the dependence of the measured noise figure on signal power was investigated as a function of suppression of the amplified signal. These results are illustrated in FIG. 2 for 0dB, 5dB, 10dB, 10dB and 40dB suppression of the signal. From FIG. 2 it can be seen that 20dB of signal suppression provides an accurate value for the noise figure under heavily saturated conditions. The polarization drift is sufficiently small that this degree of suppression is maintained for extended periods. Thus, extended series of measurements can be carried out without any need to readjust the polarizer or polarization controllers.

Thus, there is disclosed an arrangement which can be automated for simultaneously, accurately determining the gain and noise figure of an optical fiber amplifier in both the unsaturated and saturated states which is simple, inexpensive and easily automated to allow for the rapid acquisition of data.

In those instances where it is not desired that simultaneous measurements be obtained of the ASE plus the signal and the ASE absent the signal, the 3dB coupler 46 can be eliminated. The ASE noise level is measured by adjusting the polarization controller to minimize the signal for determination of the ASE spectral density and then rotating the polarizer 90° to pass the signal for the gain determination.

Using the invention here disclosed, it has been observed that, for small input signals, the signal sidebands are well below the ASE noise level and the prior art curve-fitting method of measuring ASE noise level is relatively accurate. But, as the input signal increases, the sidebands of the signal are no longer small compared to the ASE noise level. Thus, with large input signals, the sidebands of the signal becomes difficult to separate from the ASE level, and these sidebands distort the shape of the ASE spectrum around the signal wavelength which result in inaccurate determination of the noise figure. The invention here disclosed provides a more accurate measurement of noise level because, with polarization-nulling, this distortion is eliminated.

Obviously, the invention here disclosed can be used for measurements of counter-propagating pumping and bi-directional pumping to obtain accurate operating parameters, such as for example noise figure, for any degree of saturation of an optical fiber amplifier.

It will thus be appreciated that those skilled in the art will be able to devise numerous arrangements which, although not explicitly shown or described herein, embody the principles of the inventions. Accordingly, all such alternatives, modifications and variations which fall within the spirit and broad scope of the appended claims will be embraced by the principles of the invention.

We claim:

1. An arrangement for determining a parameter of an optical amplifier comprising a polarizer coupled to receive a polarized signal amplified by the optical amplifier and to receive amplified spontaneous emission from the optical amplifier, means to orient the polarizer to suppress the linearly polarized amplified signal while simultaneously passing the amplified spontaneous emission and, an optical signal detector coupled to receive the signal from the polarizer to generate the value of the amplified spontaneous emission.

2. The arrangement of claim 1 further comprising a polarization controller located upstream of said polarizer to insure linear polarization of the amplified signal from the amplifier, the polarizer and the polarization controller being oriented relative to each other to allow the polarizer to suppress the amplified signal, and means to condition said polarizer to allow both the amplified signal and the amplified spontaneous emission to pass to said optical detector.

3. The arrangement of claim 2 wherein said optical signal detector comprises an optical spectrum analyzer.

4. The arrangement of claim 3 wherein
said amplifier is an erbium-doped optical fiber amplifier.

5. An arrangement for determining a parameter of an optical amplifier comprising
   a polarizer coupled to receive a signal amplified by the fiber amplifier and amplified spontaneous emission from the optical amplifier,
   a polarization controller located upstream of said polarizer to insure linear polarization of the amplified signal, the polarizer and the polarization controller being oriented relative to each other to suppress the linearly polarized amplifier signal while simultaneously passing the amplified spontaneous emission, and
   an optical signal detector coupled to receive the amplified spontaneous emission with suppressed amplified signal passed by the polarizer to generate a spectral density signal.

6. The arrangement of claim 5 further comprising
   means coupled to orient the state of polarization of the polarizer to be orthogonal to the linear polarized state of the amplified signal.

7. The arrangement of claim 6 for determining the noise figure NF(dB) of an optical amplifier from the relationship $$NF(dB) = 10\log_{10}\frac{P_{ASE}}{h\nu GB}$$

where $P_{ASE}$ is the detected amplified spontaneous emission noise level measured by said optical signal detector in a specified optical bandwidth B,
   h is Planck's constant;
   $\nu$ is the optical frequency; and
   G is the gain of the amplifier;

8. A method of determining a parameter of an optical amplifier comprising the steps of
   directing a signal amplified by the optical amplifier and amplified spontaneous emission from the amplifier to a polarizer,
   locating a polarization controller downstream of the polarizer to insure linear polarization of the amplified signal,
   setting the polarizer to have its state of polarization orthogonal to the state of polarization of the amplified signal to cause the polarizer to suppress the amplified signal and pass the amplified spontaneous emission,
   determining sequentially the amplified spontaneous emission power $P_{ASE}$ passed by the polarizer with the amplified signal suppressed, and the gain G of the optical amplifier, and
   determining the noise figure NF(dB) of the optical amplifier from the relationship $$NF(dB) = 10\log_{10}\frac{P_{ASE}}{h\nu GB}$$

where $P_{ASE}$ is the measured amplified spontaneous emission power in a specific optical bandwidth B;
   h is Planck's constant;
   $\nu$ is the optical frequency; and
   G is the gain of the optical fiber amplifier.

9. An arrangement for determining a parameter of an optical amplifier comprising
   a coupler coupled to the output of the optical amplifier to divide a signal amplified by the optical amplifier and amplified spontaneous emission from the optical fiber amplifier into a first signal and a second signal,
   a polarizer coupled to receive the first signal from said coupler,
   a polarization controller located upstream of said polarizer to insure linear polarization of the amplified signal, the state of polarization of said polarizer being oriented to suppress the linearly polarized amplified signal while simultaneously passing the amplified spontaneous emission,
   a first optical signal detector coupled to receive the signal from the polarizer to detect the spectral density of the amplified spontaneous emission with suppressed amplified signal passed by the polarizer, and
   a second optical signal detector coupled to receive the second signal comprised of the amplifier signal and the amplified spontaneous emission from the coupler, said first and second signals being detected simultaneously.

10. The arrangement of claim 9 wherein
said first optical signal detector is an optical spectrum analyzer.

11. The arrangement of claim 10 wherein
said optical amplifier is an erbium doped fiber amplifier.

12. The arrangement of claim 11 for determining the noise figure NF(dB) of the optical amplifier from the relationship $$NF(dB) = 10\log_{10}\frac{P_{ASE}}{h\nu GB}$$

where $P_{ASE}$ is the detected amplified spontaneous emission measured by the first optical signal detector at the bandwidth B;
   h is Planck's constant;
   $\nu$ is the optical frequency; and
   G is the gain of the amplifier obtained at the same time that $P_{ASE}$ is obtained.

13. A method of determining an operating parameter of an amplifier comprising the steps of
   splitting into first and second parts a signal from the amplifier where each part consists of a signal amplified by the amplifier and amplified spontaneous emission from the amplifier,
   linearly polarizing the amplified signal of the first part of the split signal,
   directing the first part of the split signal to a polarizer having its state of polarization orthogonal to that of the state of polarization of the amplified signal to suppress the amplified signal and pass the amplified spontaneous emission,
   determining from the signal passed by the polarizer the amplified spontaneous emission power level $P_{ASE}$.

14. The method of claim 13 further comprising the step of
   determining the gain G of the amplifier at the same time that the amplified spontaneous emission power level $P_{ASE}$ is determined, and using the amplified spontaneous emission power level $P_{ASE}$ and gain C to determine the noise figure of the amplifier from the relationship $$NF(dB) = 10\log_{10} \frac{P_{ASE}}{h\nu GB}$$

where $P_{ASE}$ is the measured amplified spontaneous emission noise power level in a specific optical bandwidth B, h is Planck's constant;

$\nu$ is the optical frequency; and

G is the gain of the optical amplifier.

15. A method for determining an operating parameter of an optical amplifier which generates a polarized output signal corrupted by non-polarized noise, said method comprising the steps of passing at least a first portion of said signal through a polarizer to extract said noise component, and determining said operating parameter as a function of at least a second portion of said output signal and the extracted noise component.

16. The method of claim 15 wherein said non-polarized noise is amplified spontaneous emission.

17. The method of claim 16 wherein said first and second portions of said signal are discrete time portions thereof.

18. The method of claim 16 wherein said passing step includes the step of passing said output signal through a signal splitter to provide said first and second portions.

* * * * *